United States Patent [19]

Drone et al.

[11] 3,841,450
[45] Oct. 15, 1974

[54] SPRING APPLIED STEERING BRAKES CONTROLLED BY TRANSMISSION CLUTCH PRESSURE

[75] Inventors: Gary A. Drone; Roy C. Ross, both of Springfield, Ill.

[73] Assignee: Fiat-Allis Construction Machinery Inc., Milwaukee, Wis.

[22] Filed: Mar. 16, 1973

[21] Appl. No.: 342,153

[52] U.S. Cl. ............. 192/4 C, 192/13 R, 192/87.19
[51] Int. Cl. ............................................. B60k 29/00
[58] Field of Search .................. 192/4 A, 4 C, 13 R

[56] References Cited
UNITED STATES PATENTS

| | | | |
|---|---|---|---|
| 3,386,523 | 6/1968 | Ruhl | 192/4 C X |
| 3,458,018 | 7/1969 | Shore | 192/4 C |
| 3,460,645 | 8/1969 | Brown et al. | 192/13 R |

Primary Examiner—Benjamin W. Wyche

[57] ABSTRACT

A control system for crawler tractor spring applied brakes having hydraulic actuators for releasing the brakes. Pressure fluid from the steering clutch control is directed to the actuators to release the brakes for normal crawler tractor operation and a brake pressure regulating valve is biased by the fluid pressure in the power shift transmission control whereby a pressure drop in the latter during direction changes and neutral condition causes the brake regulating valve to drop the brake pressure thereby allowing the brake springs to automatically apply the brakes.

6 Claims, 1 Drawing Figure

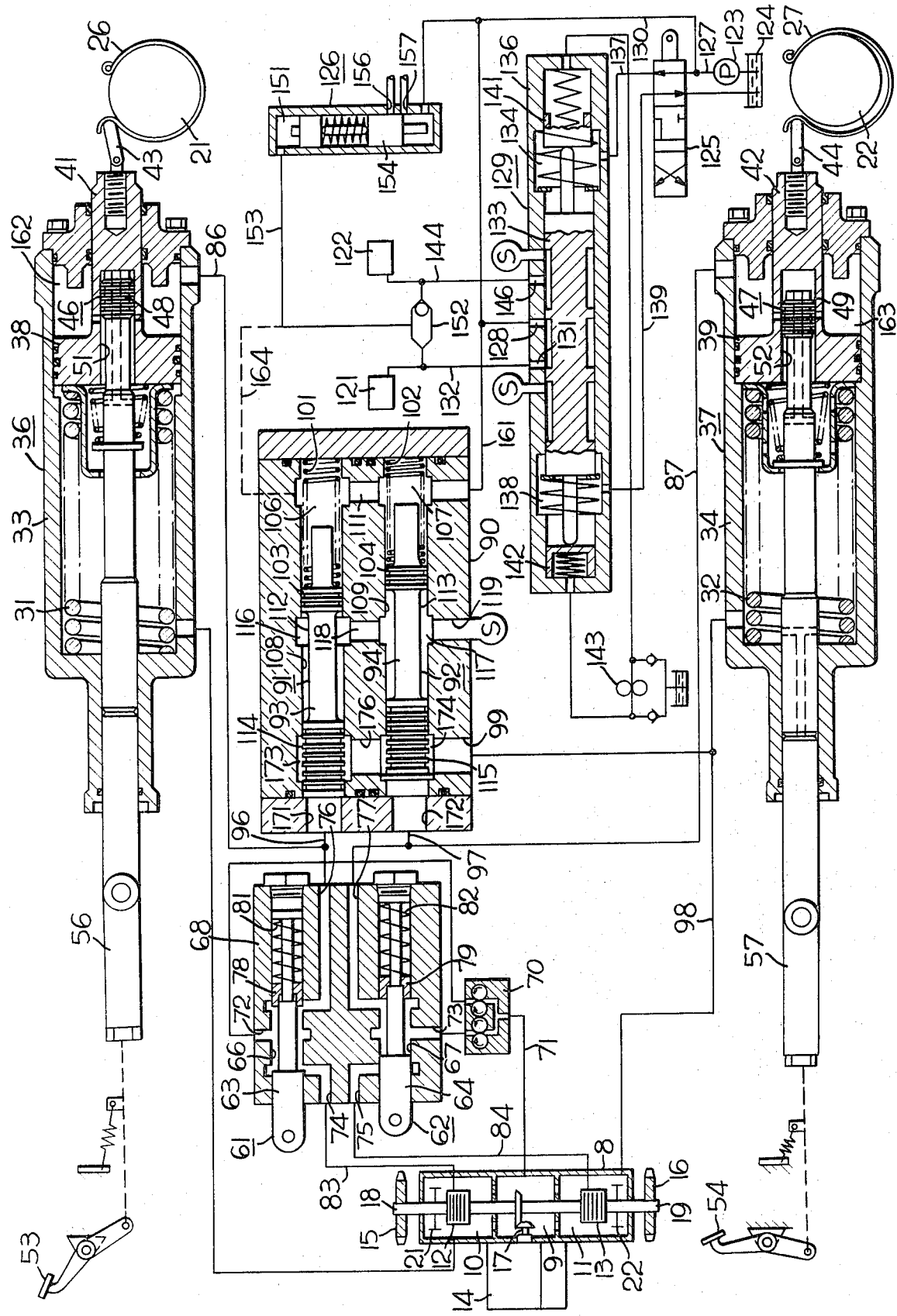

SPRING APPLIED STEERING BRAKES CONTROLLED BY TRANSMISSION CLUTCH PRESSURE

BACKGROUND OF THE INVENTION

As crawler tractors become larger in size it is necessary that the brakes be power operated. In order to stop a large vehicle on loss of power it heretofore has been suggested that spring applied brakes be used which brakes are disengaged by a power device such as a hydraulic or pneumatic actuator. It is recognized that others have suggested braking in neutral for crawler tractors. Various braking systems of interest are shown in U.S. Pat. Nos. 3,386,523, 3,458,018 and 3,604,544.

BRIEF DESCRIPTION OF THE INVENTION

The pressure drop which occurs in the automatic transmission control when effecting a directional shift, is utilized to cause the pressure to the brake actuators to drop thereby permitting the spring loaded brakes of a tractor to be applied automatically when changing vehicle direction. A hydraulic control system is provided for the steering clutches and brakes wherein the brakes are placed downstream of the steering clutches. A pair of pressure regulating valves are provided for the brake actuators and these are biased by the fluid pressure in the change speed power shift transmission control system which is otherwise separate from the steering clutch and brake control system. The integrated brake system of this invention includes these features: (1) the brakes are spring applied and hydraulically released by a hydraulic actuator controlled by a manually operated valve; (2) the brakes are automatically applied when the transmission is shifted into neutral and when a directional shift is made; and (3) the brakes are applied automatically by their operating springs when there is a fluid pressure failure in the brake control system or the transmission control system.

DETAILED DESCRIPTION OF THE INVENTION

Referring to the drawing, the invention is schematically shown incorporated in a crawler tractor. The main frame of the tractor includes a final drive housing 8 having a bevel gear compartment 9, and a pair of steering clutch compartments 10, 11 in which right and left steering clutches 12, 13 are located. The tractor also includes a power shift transmission 14 for changing speed and direction. The clutches 12, 13 serve to connect right and left drive sprockets 15, 16 to an output shaft 17 of the power shift transmission 14. The drive sprockets 15, 16 are secured for rotation with a pair of sprocket shafts 18, 19 to which a pair of brake drums 21, 22 are connected. The brakes of the crawler tractor are applied by large coil springs 31, 32 disposed within cylinders 33, 34 of brake actuators 36, 37. The brake actuators 36, 37 include pistons 38, 39 having piston rods 41, 42 extending from the ends of the cylinders 33, 34, the rods being connected to brake bands 26, 27 by links 43, 44. The brake bands 26, 27 are adapted to engage the right and left brake drums 21, 22. Brake valves 46, 47 for controlling the vehicle brakes include shiftable flow control components 48, 49 reciprocably mounted in bores 51, 52 in the pistons 38, 39. The shiftable flow control components 48, 49 are connected to right and left brake pedals 53, 54 by suitable mechanical linkages 56, 57. The brake actuator cylinders 33, 34 are secured to the main frame of the crawler tractor by means not shown.

The right and left steering clutches 12, 13 are controlled by a combined steering clutch and brake control system including right and left steering clutch valves 61, 62 having valve spools 63, 64 reciprocably disposed within bores 66, 67 of a valve housing 68 which is common to the two valves 61, 62. A source of hydraulic fluid pressure, in the form of an engine driven pump unit 70, is connected to supply ports 72, 73 of the valves 61, 62. The pump unit 70 has its intake conduit 71 connected to the bevel gear compartment 9. The steering clutch control valves 61, 62 also include clutch ports 74, 75 and brake ports 76, 77. The steering clutch valves 61, 62 additionally include clutch pressure control valves in the form of shiftable sleeves 78, 79 biased by coil springs 81, 82 carried on the valve spools 63, 64. The clutch ports 74, 75 are connected to a pair of conventional spring applied steering clutches 12 and 13, respectively, by a pair of passages 83, 84. A pair of brake passages 86, 87 connect the right and left brake actuators 36, 37 to brake ports 76, 77. The steering clutch valves 61, 62 are shiftable from a clutch disengaged position, in which 61 is illustrated, to a clutch engaged position, in which 62 is illustrated. It will be noted that the flow control element 63 of clutch control valve 61 has been shifted to the left thereby connecting the supply port 72 to the clutch port 74. The clutch pressure control sleeve 78 moves to the right when clutch operating pressure is reached thereby permitting excess fluid to flow to the right brake actuator 33 by way of brake port 76 and passage 86. Left clutch control valve element 64 permits fluid delivered by the pump unit 70 to flow to the left brake actuator 34 without being subjected to pressure regulation by clutch pressure control sleeve 79.

Brake pressure regulation is provided by right and left brake pressure regulating valves 91, 92 disposed in housing 90 having a pair of inlet ports 171, 172 and a pair of outlet ports 173, 174 interconnected by a cross passage 176. The pressure drop in neutral condition of the power shift transmission control system is used to bias the regulating valves 91, 92 thereby regulating the pressure to the right and left brake actuators 36, 37. The brake regulating valves 91, 92 include flow control elements 93, 94 which are shiftable between a closed position in which 93 is illustrated to an open position in which element 94 is illustrated. The pressure regulating valves for the brakes are located in bypass passages 96, 97 which are connected in parallel to a common return to reservoir conduit 98 through outlet passage 99. Relatively light coil springs 101, 102 bias the flow control elements 93, 94 to their closed position. The major biasing of the flow control elements 93, 94 is achieved by fluid actuators formed by circumferentially grooved piston portions 103, 104 of elements 93, 94 and pressure chambers 106, 107 in the end of the valve bores 108, 109. These pressure chambers 106, 107 are interconnected by a cross passage 111. Reduced diameter portions 112, 113 of the flow control elements 93, 94 extend between the grooved pistons 103 and 114 on the element 93, and the grooved pistons 104, 115 on the element 94. The reduced diameter portions 112, 113 of elements 93, 94 communicate with ports 116, 117 which are interconnected by a passage 118. Any leakage past the grooved piston portions of elements 93, 94 is passed to the sump, indicated by the letter S, by a passage 119.

The change speed transmission 14 is a power shift transmission in which hydraulically actuated forward and reverse clutches 121, 122 are located. The forward and reverse clutches 121, 122 are controlled by a hydraulic control system including a fluid pump 123 which draws fluid from a suitable sump 124 and delivers fluid to a pilot valve 125 under pressure regulation of a transmission pressure regulating valve 126. Fluid is delivered by the pump 123 to the pilot valve 125 by way of pump output passage 127 and is delivered to an input port 128 of an inhibitor type control valve 129 by conduit 130. The pilot valve 125 is illustrated in its forward position in which fluid from the pump 123 is delivered by a conduit 137 to an actuator comprising a fluid pressure chamber 134 formed in a housing 136 of the inhibitor valve 129. A second actuator comprising a pressure chamber 138 is formed at the left end of the housing 136 and is connected to the pilot valve 125 by a conduit 139. Shift inhibiting actuators 141, 142 are in abutting relation to end portions of the valve spool 133 and are alternately supplied fluid by a ground driven pump 143 which is connected in driven relation to one of the sprocket drive shafts 18, 19 by means not shown. As illustrated, the vehicle is moving in a forward direction and pump 143 is delivering fluid to actuator 141. As illustrated, pilot valve 125 has pressurized chamber 134 of the inhibitor valve 129, causing its spool 133 to be shifted to the left to its forward position in which pressure fluid is delivered to the forward clutch 121 by passages 127, 130, ports 128, 131 and passage 132.

If the pilot valve 125 is shifted from its forward position to its reverse position while the tractor is moving forward at a sufficient speed to require considerable braking to stop the tractor, the pressure fluid delivered by pump 143 to actuator 141 will prevent the fluid pressure delivered by pilot valve 125 to chamber 138 from moving the valve spool 133 to the right to its reverse position until the tractor approaches a standstill condition. Thus delivery of pressure fluid to reverse clutch 122 by conduit 144 connected to clutch supply port 146 is delayed until the tractor has virtually stopped.

When pressure fluid is delivered to either of the clutches 121, 122 some pressure fluid is conveyed to the top chamber 151 of the regulator valve 126 by way of a two-way check valve 152 and conduit 153. As illustrated, the lower spool 154 of the regulator valve 126 has moved downwardly closing off lubrication port 156 and partially closing a port 157 connected to the torque converter, not shown. In this position of the regulator valve 126, a relatively high pressure level is established for operation of the forward and reverse clutches 121, 122. When pressure fluid is not delivered to either of the clutches 121, 122, the regulator valve 126 is not biased by any substantial pressure in chamber 151, and the spool 154 will move upwardly allowing the output of pump 123 to flow out the torque converter port 157 and lubrication port 156 at a reduced pressure level. This reduced pressure level will exist when the transmission control is in neutral and during a direction change.

The steering and braking control is integrated with the transmission control by a conduit 161 connecting the pressure chambers 106, 107 of the brake pressure regulating valves 91, 92 to conduit 130, which in turn is connected to the output conduit 127 of pump 123. When the transmission 14 is in neutral or a directional shift is made, the fluid pressure in conduits 127, 130, 161 will drop to a low level, as established by the regulating valve 126, and the brake pressure regulating valves 91, 92 will allow fluid to flow to sump at a low pressure, thereby permitting the brake springs 31, 32 to apply the brakes. Thus the tractor will be braked automatically when the transmission 14 is in neutral and during a directional shift.

As illustrated, the operator has depressed right brake pedal 53, allowing the pressure chamber 162 of the brake actuator 36 to be exhausted which allows spring 31 to apply the right brake. Since in the illustrated condition of the controls, a high pressure level is maintained by the regulator valve 126, the brake pressure regulator valve 92 is maintaining a relatively high pressure in the pressure chamber 163 of brake actuator 37, thereby releasing the left brake.

From the foregoing it is apparent that the spring loaded brakes are applied in neutral and directing conditions of the transmission control. It should also be noted that on failure of pressure in the brake control or the transmission control the brakes will automatically be applied, thus increasing tractor safety.

Inasmuch as two levels of pressure exist in conduit 153 during neutral and engaged conditions of the forward and reverse clutches 121, 122, the biasing actuators of the brake pressure regulating valves 91, 92 may, in the alternative, be connected to conduit 153 as shown by dash line 164.

The embodiments of the invention in which an exclusive property or privilege is claimed are defined as follows:

1. In a crawler tractor having a power shift transmission with forward and reverse clutches, right and left final drive sprockets connected to the transmission output through right and left hydraulically controlled steering clutches, respectively, and right and left brakes operatively associated with said right and left sprockets, respectively, hydraulic control means comprising:

a first control system for said steering clutches and brakes including right and left fluid operated brake actuators connected to said right and left brakes, respectively, and operable on pressurization to disengage said brakes, a pair of springs operatively associated with said right and left brakes, respectively, urging the latter to their engaged condition, right and left clutch control valves, each having a control element shiftable between clutch engaged and clutch disengaged positions and each having a clutch port, a supply port and a brake port, a pair of passages operatively connecting said clutch ports of said right and left clutch valves to said right and left clutches, respectively, a source of fluid pressure connected to each of said supply ports, a pair of brake passages connecting said brake ports of said right and left clutch control valves to said pressure chambers of said right and left brake actuators, respectively, clutch pressure control means operatively associated with each of said clutch control valves operable when said valves are in their clutch disengaging position to permit flow from said supply port to said brake port only when the fluid pressure in said supply port is above a predetermined minimum clutch disengaging pressure, a bypass passage connected to each of said brake passages, and a brake pressure regulating valve in each of said bypass passages and including a shiftable flow control element having closed and open positions, and fluid actuator means operable on pressurization to bias said flow control elements toward their closed position, a second control system for said power shift transmission for establishing forward, reverse and neutral conditions and having a circuit with fluid at a predetermined low pressure when said transmission is in said neutral condition and at a predetermined high pressure when said transmission is in either of said forward and reverse conditions, and conduit means connecting said circuit to said fluid actuator means, whereby said brakes are engaged in said neutral condition of said transmission.

2. In a crawler tractor having a power shift transmission with forward and reverse clutches, right and left final drive sprockets connected to the transmission output through right and left hydraulically controlled steering clutches, respectively, and right and left brakes operatively associated with said right and left sprockets, respectively, hydraulic control means comprising:

a first control system for said steering clutches and brakes including right and left fluid operated brake actuators connected to said right and left brakes, respectively, and operable on pressurization to disengage said brakes, a pair of springs operatively associated with said right and left brakes, respectively, urging the latter to their engaged condition, right and left clutch control valves, each having a control element shiftable between clutch engaged and clutch disengaged positions and each having a clutch port, a supply port and a brake port, a pair of passages operatively connecting said clutch ports of said right and left clutch valves to said right and left clutches, respectively, a source of fluid pressure connected to each of said supply ports, a pair of brake passages connecting said brake ports of said right and left clutch control valves to said pressure chambers of said right and left brake actuators, respectively, clutch pressure control means operatively associated with each of said clutch control valves operable when said valves are in their clutch disengaged position to permit flow from said supply port to said brake port only when the fluid pressure in said supply port is above a predetermined minimum clutch disengaging pressure, a bypass passage connected to each of said brake passages, and a brake pressure regulating valve in each of said bypass passages and including a shiftable flow control element having closed and open positions, and fluid actuator means operable on pressurization to bias said flow control elements toward their closed position, a second control system for said power shift transmission including fluid pump means having an output, a transmission control valve connected to said pump means output and having neutral, forward and reverse positions, forward and reverse clutch supply conduits connecting said forward and reverse clutches, respectively, to said transmission control valve, and a transmission pressure regulating valve operatively associated with the output of said fluid pump means and automatically maintaining the pump output pressure at a predetermined low level when said transmission control valve is in its neutral position and maintaining the pump output pressure at a predetermined high pressure level when said transmission control valve is in either of said forward and reverse positions, and a fluid conduit interconnecting said pump means output and said fluid actuator means, whereby said brakes are engaged when said power shift transmission is in neutral.

3. In a crawler tractor having a power shift transmission with forward and reverse clutches, right and left final drive sprockets connected to the transmission output through right and left hydraulically controlled steering clutches, respectively, and right and left brakes operatively associated with said right and left sprockets, respectively, hydraulic control means comprising:

a first control system for said steering clutches and brakes including right and left fluid operated brake actuators connected to said right and left brakes, respectively, and operable on pressurization to disengage said brakes, a pair of springs operatively associated with said right and left brakes, respectively, urging the latter to their engaged condition, right and left clutch control valves, each having a control element shiftable between clutch engaged and clutch disengaged positions and each having a clutch port, a supply port and a brake port, a pair of passages operatively connecting said clutch ports of said right and left clutch valves to said right and left clutches, respectively, a source of fluid pressure connected to each of said supply ports, a pair of brake passages connecting said brake ports of said right and left clutch control valves to said pressure chambers of said right and left brake actuators, respectively, clutch pressure control means operatively associated with each of said clutch control valves operatively associated with each of said clutch control valves operable when said valves are in their clutch disengaged position to permit flow from said supply port to said brake port only when the fluid pressure in said supply port is above a predetermined minimum clutch disengaging pressure, a bypass passage connected to each of said brake passages, and a brake pressure regulating valve in each of said bypass passages and including a shiftable flow control element having closed and open positions, and fluid actuator means operable on pressurization to bias said flow control elements toward their closed position, and a second control system for said power shift transmission including fluid pump means a transmission control valve connected to said pump means and having neutral, forward and reverse positions, and foward and reverse clutch supply conduits connecting said forward and reverse clutches, respectively, to said transmission control valve, and operating means connecting said clutch supply conduits to said fluid actuator means to pressurize the latter on delivery of pressure fluid to either of said forward and reverse clutches, said fluid actuator means being in substantially nonpressurized condition when said transmission is in neutral.

4. The control means of claim 3 wherein said operating means includes check valve means preventing flow from one clutch supply conduit to the other by way of said operating means.

5. The control means of claim 3 wherein said first control system includes a pair of manually operable brake valves operatively associated with said brake actuators, respectively.

6. The control means of claim 4 wherein said right and left brake actuators include pistons connected to said right and left brakes and wherein said brake valves include a shiftable flow control component within said pistons.

* * * * *